(12) United States Patent
Mercier et al.

(10) Patent No.: US 7,445,297 B2
(45) Date of Patent: Nov. 4, 2008

(54) WHEEL ASSEMBLY FOR MOUNTING TO AN AXLE OF A WHEELED PRODUCT

(75) Inventors: Laurier Mercier, St-Damien (CA); Roch Nolet, St-Joseph (CA)

(73) Assignee: IPL Inc., St-Damien, Quebec (CA)

( * ) Notice: Subject to any disclaimer, the term of this patent is extended or adjusted under 35 U.S.C. 154(b) by 141 days.

(21) Appl. No.: 11/334,878

(22) Filed: Jan. 19, 2006

(65) Prior Publication Data

US 2007/0164601 A1   Jul. 19, 2007

(51) Int. Cl.
  *B60B 23/00*   (2006.01)
  *B60B 27/02*   (2006.01)
(52) U.S. Cl. .............. 301/111.04; 301/111.07; 301/121
(58) Field of Classification Search ........... 301/111.01, 301/112, 118–119, 121–122, 111.04, 111.07
   See application file for complete search history.

(56) References Cited

U.S. PATENT DOCUMENTS

| | | | |
|---|---|---|---|
| 3,870,371 A | 3/1975 | Solomon | |
| 3,985,392 A | 10/1976 | Bergmann et al. | |
| 4,043,603 A | 8/1977 | Bergmann et al. | |
| 4,043,685 A * | 8/1977 | Hyams | 301/121 |
| 4,896,899 A | 1/1990 | Lawrence | |
| 5,156,533 A | 10/1992 | Hoffman et al. | |
| 5,215,356 A | 6/1993 | Lin | |
| 5,234,226 A | 8/1993 | Liu | |
| 5,238,297 A | 8/1993 | Sanders | |
| 5,277,480 A * | 1/1994 | Chiu | 301/111.07 |
| 5,577,843 A | 11/1996 | Leininger et al. | |
| 5,593,174 A | 1/1997 | Graziano et al. | |
| 5,716,107 A * | 2/1998 | Parker et al. | 301/111.07 |
| 5,902,018 A * | 5/1999 | Owen et al. | 301/111.04 |
| 5,938,294 A | 8/1999 | Chan | |
| 6,099,083 A | 8/2000 | Logan | |
| 6,116,700 A | 9/2000 | Herrera | |
| 6,120,106 A | 9/2000 | Liao | |
| 6,149,245 A | 11/2000 | Wu | |
| 6,170,920 B1 | 1/2001 | Markling | |
| 6,189,979 B1 | 2/2001 | Wu | |
| 6,280,001 B1 | 8/2001 | Parker et al. | |
| 6,286,910 B1 | 9/2001 | Kuhlman | |
| 6,328,320 B1 | 12/2001 | Walski et al. | |
| 6,354,670 B1 | 3/2002 | Cheng | |
| 6,361,121 B1 * | 3/2002 | Morris | 301/112 |
| 6,375,274 B1 | 4/2002 | Morris | |
| 6,464,305 B2 | 10/2002 | Markling | |
| 6,561,593 B2 | 5/2003 | Godwin | |

(Continued)

FOREIGN PATENT DOCUMENTS

CA   2273901   2/2000

(Continued)

*Primary Examiner*—Jason R Bellinger
(74) *Attorney, Agent, or Firm*—Ladas & Parry LLP

(57) ABSTRACT

A wheel assembly for mounting to an axle of a wheeled product includes a wheel having an opening and a locking element which is insertable in the opening to secure the wheel to the axle. The locking element has a portion engaging the wheel and a second flexible portion for releasably engaging the axle. The locking element is so constructed as to allow a tool to be inserted therethrough for releasing engagement between the wheel assembly from the axle.

10 Claims, 8 Drawing Sheets

U.S. PATENT DOCUMENTS

| | | |
|---|---|---|
| 6,637,835 B2 | 10/2003 | Morris |
| 7,108,335 B2 * | 9/2006 | Morris .................. 301/111.01 |
| 2002/0089229 A1 | 7/2002 | Morris |
| 2004/0070262 A1 | 4/2004 | Markling |
| 2004/0070263 A1 | 4/2004 | Morris |

FOREIGN PATENT DOCUMENTS

| | | |
|---|---|---|
| CA | 2425512 | 4/2002 |
| WO | WO99/62728 | 12/1999 |
| WO | WO03/059653 | 7/2003 |

* cited by examiner

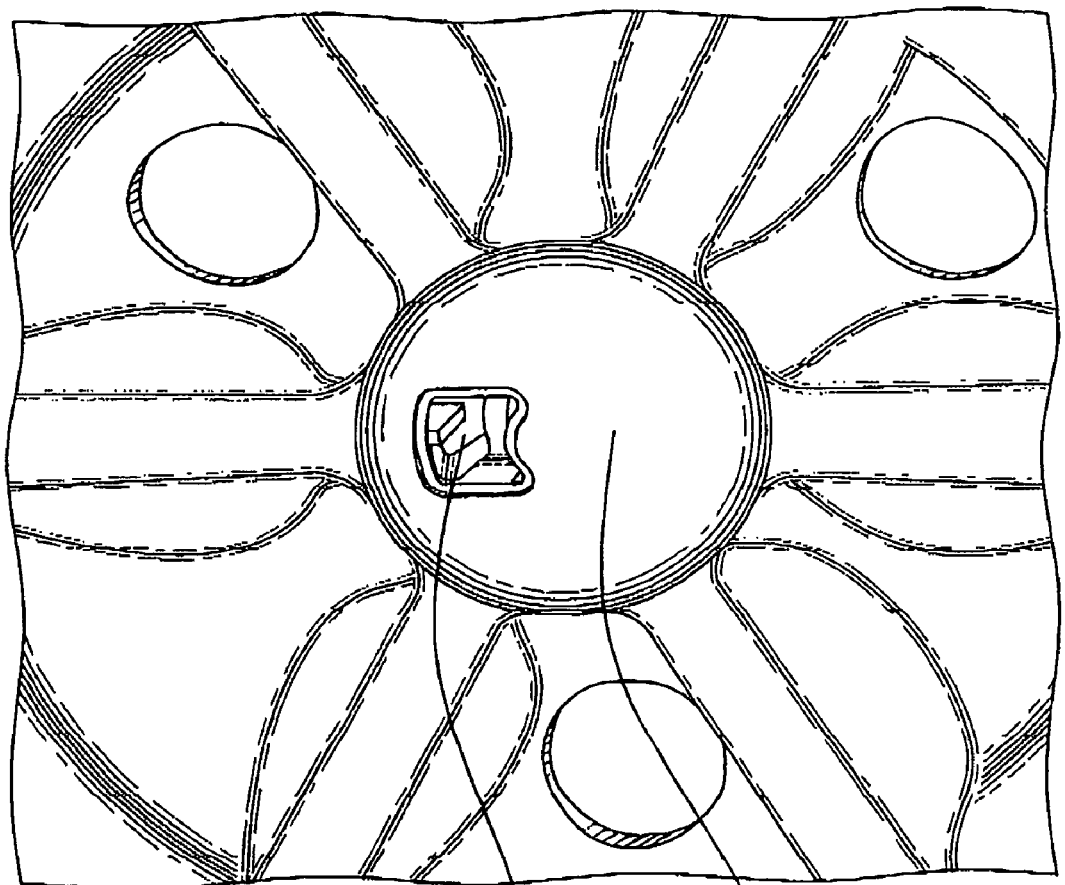

WHEEL ASSEMBLY FOR MOUNTING TO AN AXLE OF A WHEELED PRODUCT

FIELD OF THE INVENTION

The present invention relates to an assembly for mounting a wheel to an axle as well as to enable removal of the wheel from the axle and, more particularly, to wheel assemblies of the type used on wheeled products, such as refuse carts, wheeled coolers, wagons, wheel toys, BBQ, golf trolleys and the like.

BACKGROUND OF THE INVENTION

Wheel mounting assemblies designed for detachably mounting a wheel on a stub axle or shaft supported by the frame of a wheeled product are well know. For example, such assemblies may be found described in U.S. Pat. No. 6,238, 297 issued Aug. 24, 1993 to Sanders, U.S. Pat. No. 6,280,001 issued Aug. 28, 2001 to Parker at al. or in published U.S. patent application No. 2002/0089229 published Jul. 11, 2002 In the name of Morris.

SUMMARY OF THE INVENTION

The present invention is concerned with an improved wheel assembly wherein the mounting of the wheel to one end of an axle is manually easily carried out but wherein the release of the engagement of the wheel assembly to the axle is done with the use of a tool. Preferably, the tool assisting disengagement should not be visually apparent.

The present invention therefore relates to a wheel assembly comprising:
a) a wheel having an opening;
b) a locking element insertable in the opening; the element having first means in the opening engaging the wheel and detent second means for releasably engaging the axle for mounting the wheel to the axle; the second means being flexible to enable the second means to be released for engagement with the axle.

In one form of the invention, the locking element consists of a front wall, the rear of which includes a pair of rearwardly extending sections, each section including a first flexible portion for engaging the wheel and a flexible second portion for engaging the annular groove provided on the axle.

In a second embodiment of the invention, the looking element includes a front wall having one rearwardly extending section with a first portion engaging the wheel and a second flexible portion engaging the annular groove of the axle.

In one particular form of the invention, the front wall of the locking element is provided with access means to enable a tool to reach and disengage the flexible second means from the annular groove of the axle.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

BRIEF DESCRIPTION OF THE DRAWINGS

In the appended drawings:

FIG. 8 is an enlarged perspective view showing the wheel of FIG. 5 without the locking element.

DESCRIPTION Of PREFERRED EMBODIMENTS

Figure 1:
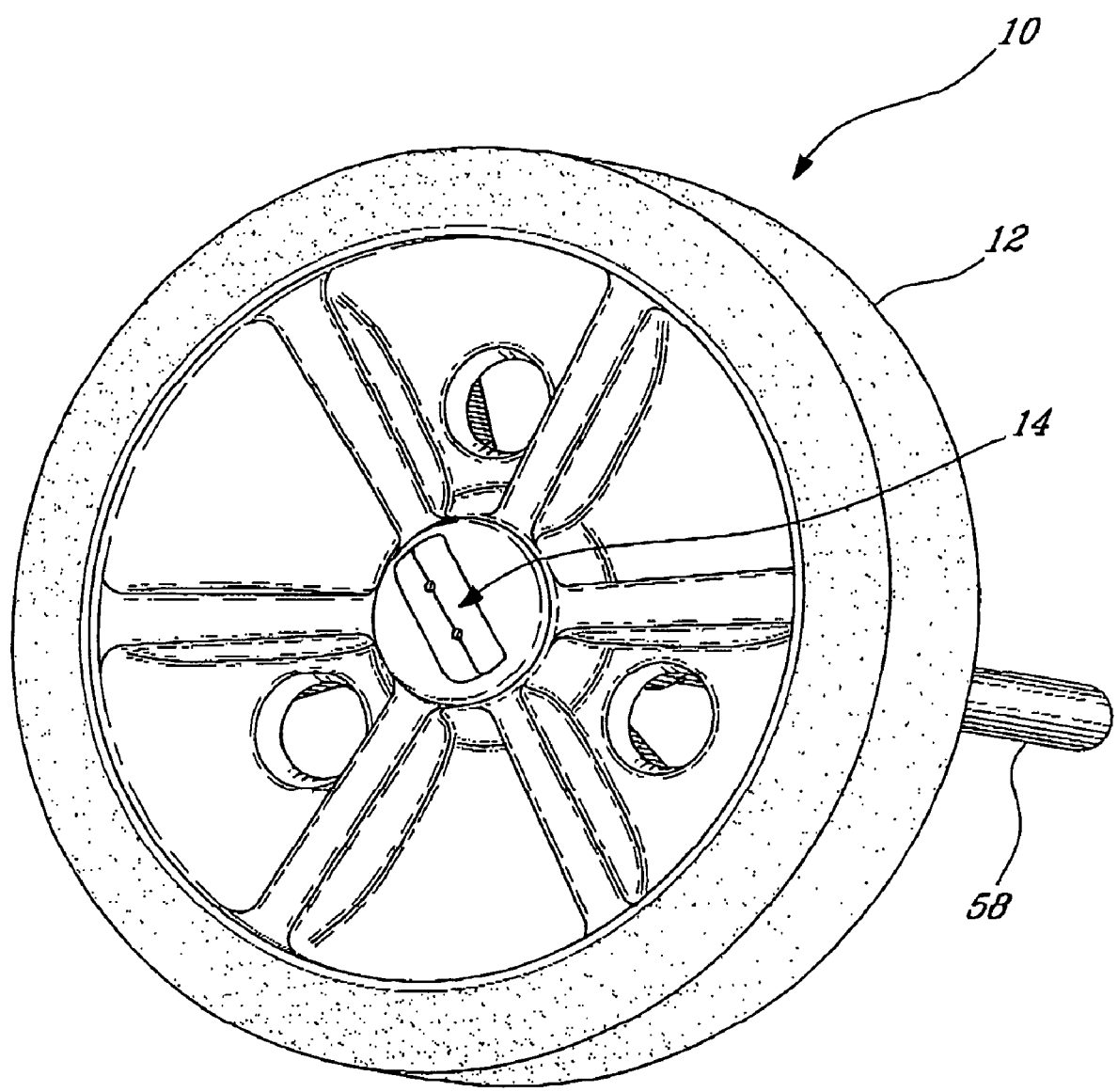
FIG. 1 is a perspective view of a wheel assembly in accordance with one embodiment of the present invention.

FIG. 1 illustrates a wheel assembly, generally denoted 10, consisting of a wheel 12 and a locking element 14 such as may be found on a variety of wheeled products as mentioned above.

Figure 2:
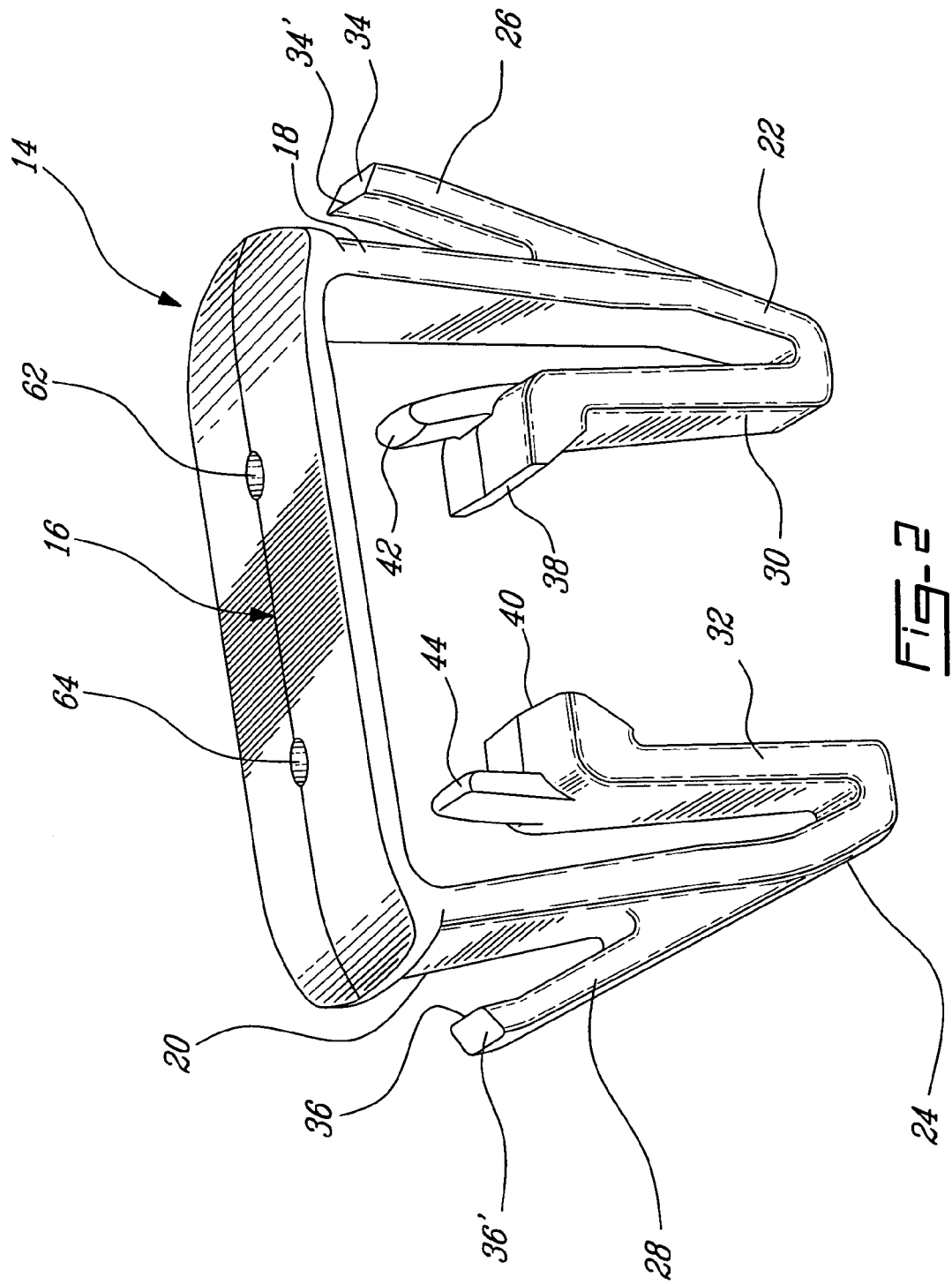
FIG. 2 is a perspective view of the locking element used in the wheel assembly of FIG. 1.

Referring to FIG. 2, the locking element 14 consists of a plastic molded body having U-shaped body consisting of a front wall 16 and a pair of rearward extensions 18 and 20, Each section 18, 20 displays, at its rearmost end, a V-shaped projection 22, 24 consisting of an outwardly projecting arm portion 26, 28 and an inner arm portion 30, 32, the function of which will be described further hereinbelow. Each projection 26, 28 has a free end 34, 36 with a chamfered edge 34', 36'. The free end of the inner arm portion 30, 32 displays a chamfered edge 38, 40, the top face of which displays a projection 42, 44.

Figure 3:
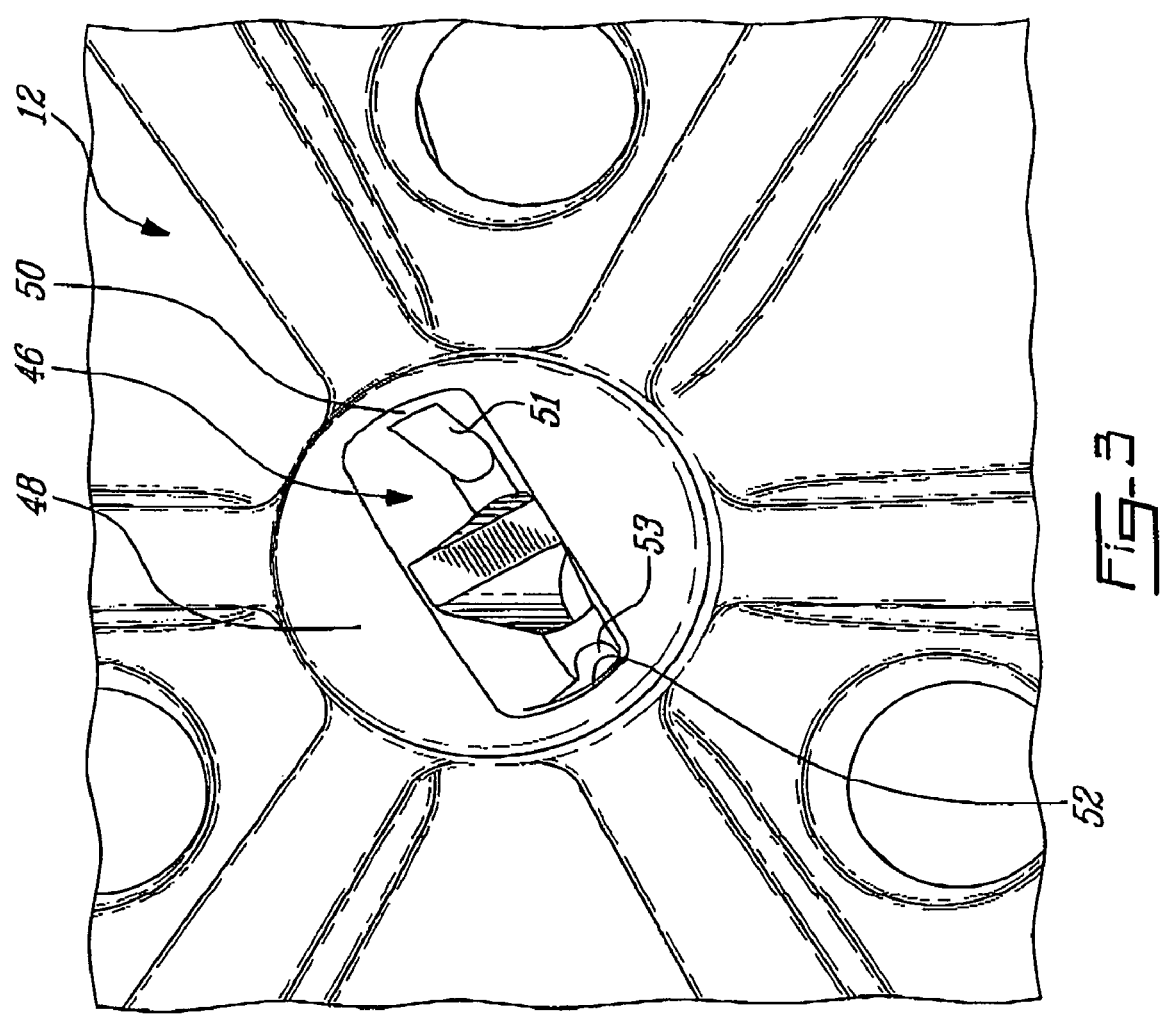
FIG. 3 is an enlarged perspective view showing the opening of the wheel without the locking element.

Referring to FIG. 3, the locking element 14 is adapted to be fitted into an opening 46 in the central area 48 of the wheel 12, the opening having a rectangular shape corresponding to the contour of the front wall 16 of the locking element.

Figure 4:
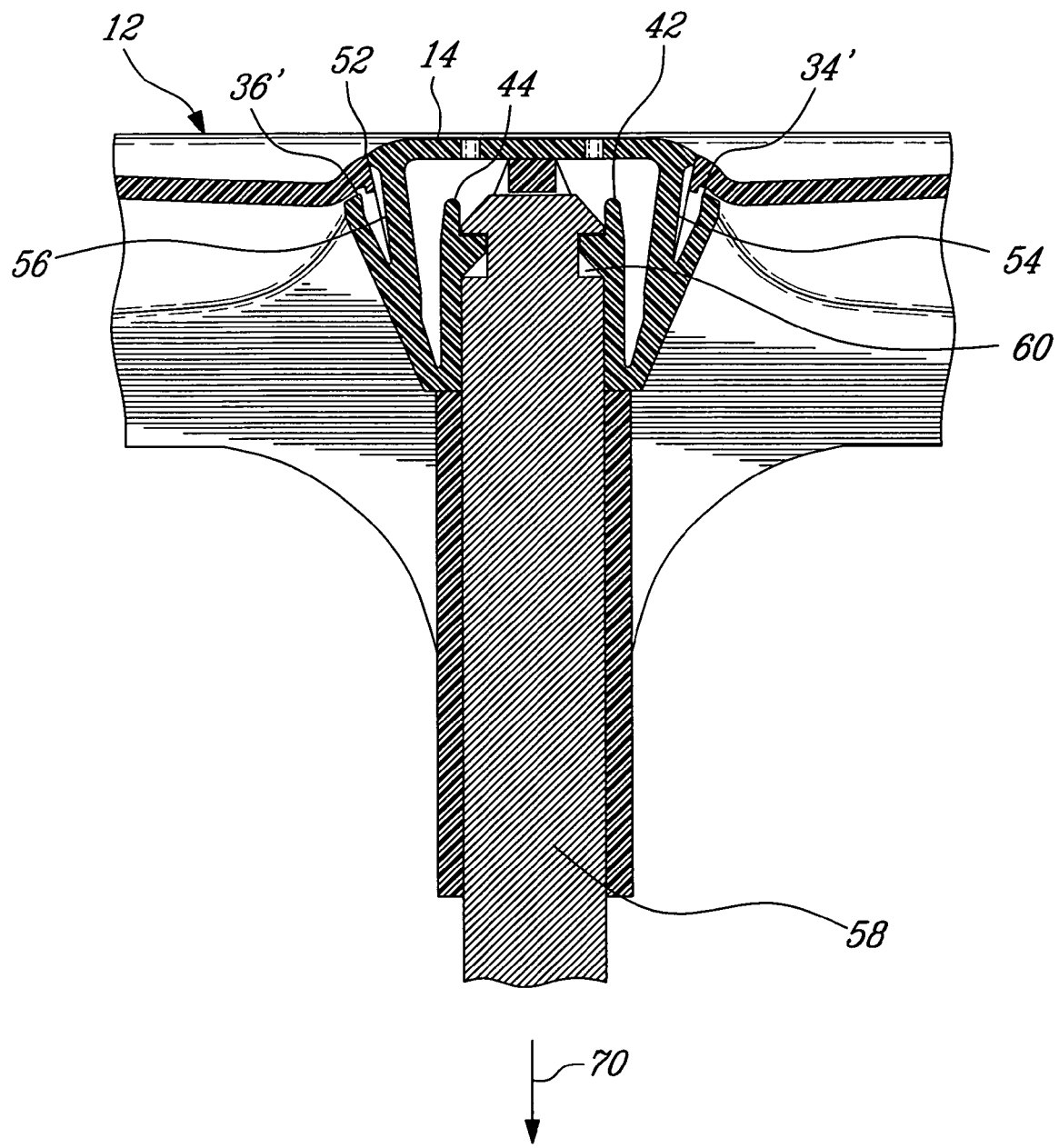
FIG. 4 is an enlarged cross-sectional view showing the engagement of the wheel assembly to an axle.

As can be deduced from FIG. 4, when the locking element 14 is inserted into the opening 46 of the wheel 12, the outer arm portions 26 and 28 of the locking element are inwardly flexed as they contact the opposite corresponding edges 50 and 52 of the wheel opening 46 to slide in their respective holes 51 and 53 at the bottom of the opening. The contact of the outer faces of arm portions 26 and 28 on the edges 50 and 52 further solidifies the locking element onto the shaft should a pulling force, as indicated by arrow 70 in figure 4, is exerted on the shaft. Thereafter, portions 26 and 28 are outwardly flexed to a position where the chamfered edges 34' and 36' are moved behind these adjacent wheel bore areas 54 and 56.

Once the locking element is mounted to the wheel, as Illustrated in FIG. 4, the wheel assembly (consisting of the wheel and the locking element) is engaged to an axle 58 having an annular groove 60 formed adjacent one end thereof. During mounting, the inner arms 30 and 32 were outwardly flexed as they contacted the outer wall of the axle until they were flexed back inwardly into the annular groove 60. Hence, the wheel assembly is thus secured to the axle end.

Figure 7:
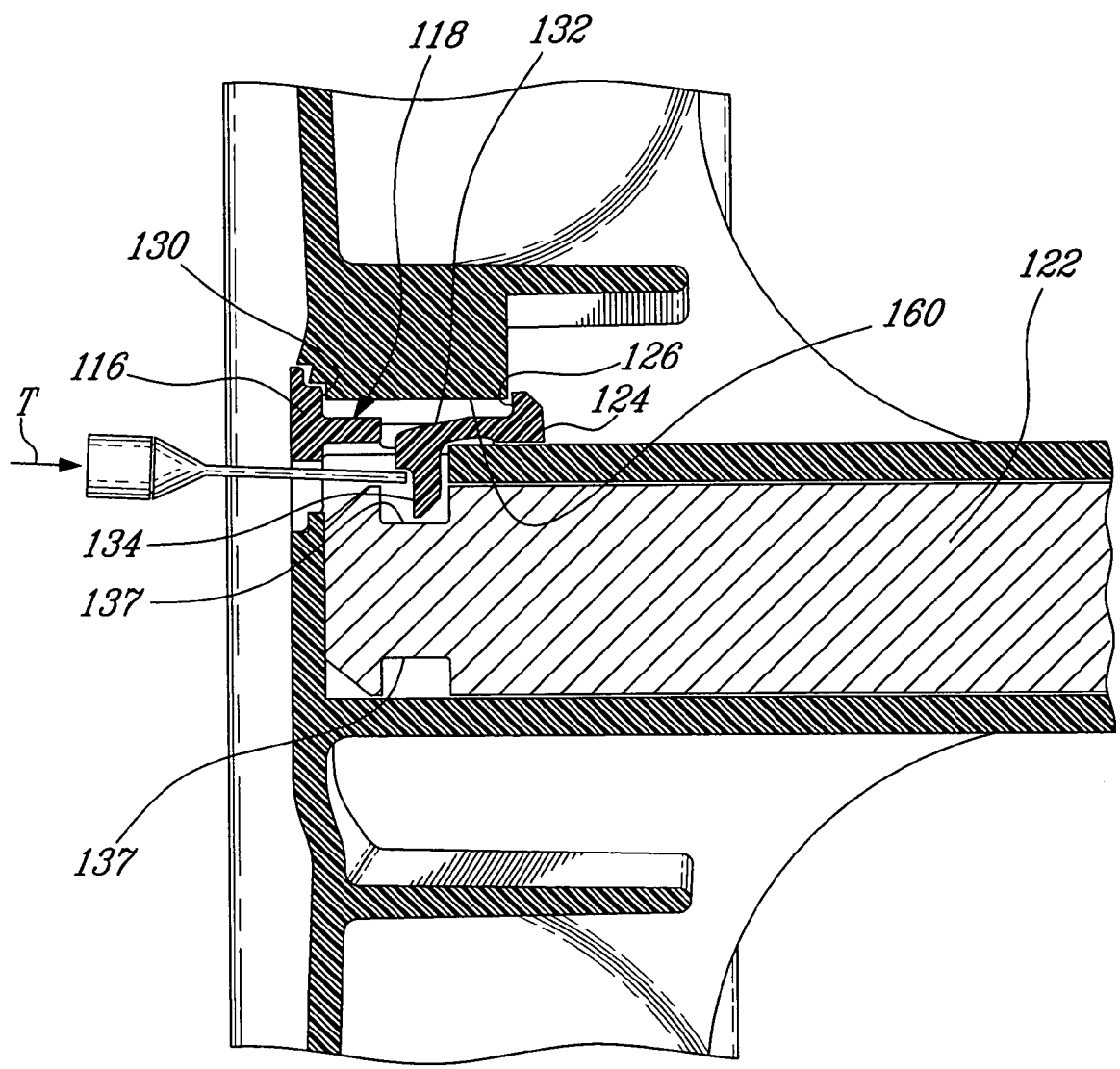
FIG. 7 is an enlarged cross-sectional view showing the engagement of the locking element with a wheel an the axle.

The front wall 16 of the locking element displays a pair of circular openings 62 and 64 (see FIG. 2) allowing a tool (T) shown in FIG. 7) to be inserted therethrough and to contact the projections 42 and 44 of the arms enabling a disengagement of the chamfered ends 38 and 40 from the annular groove 60 and to remove the wheel assembly from the axle.

Figure 5:
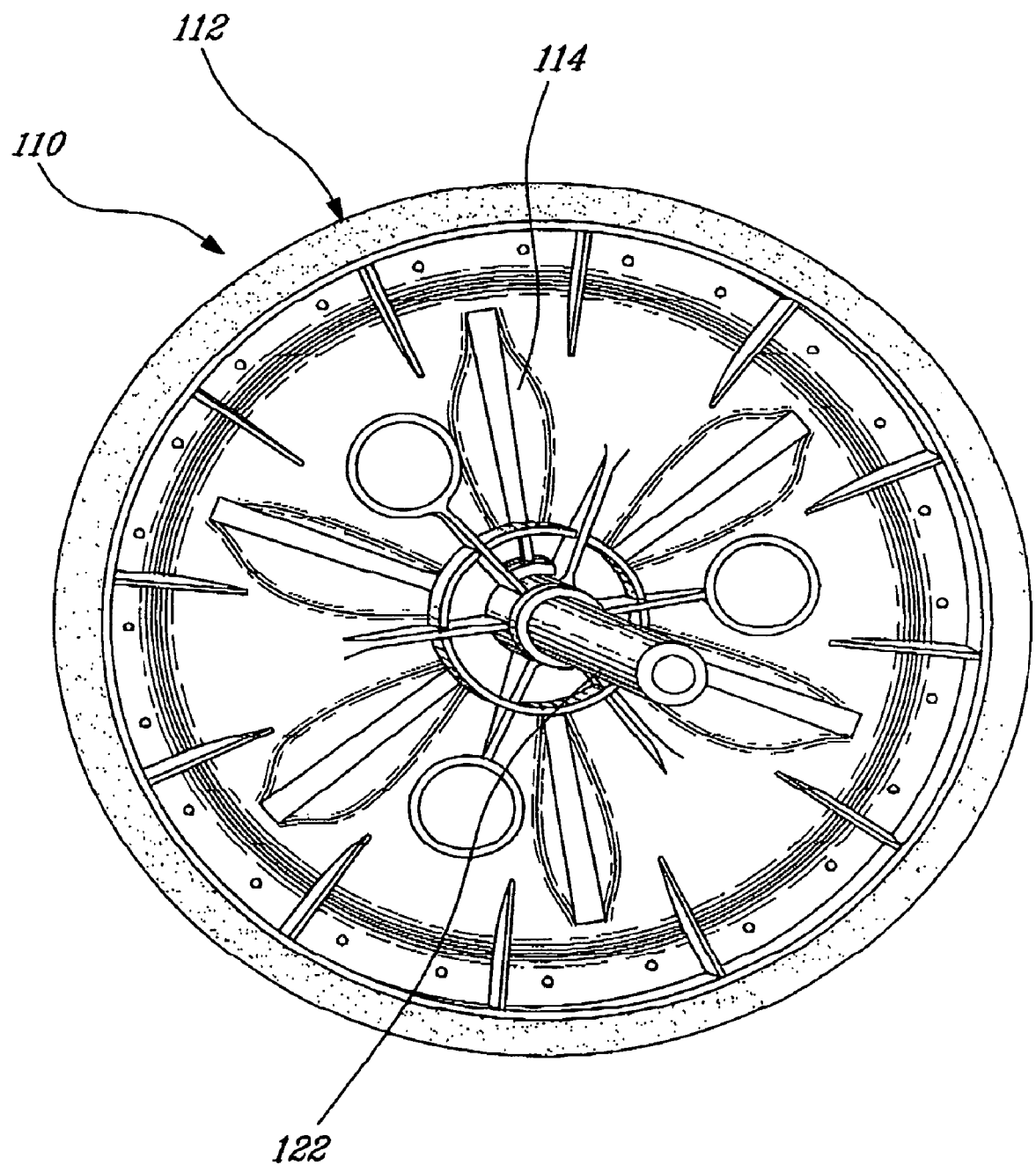
FIG. 5 is a perspective view of a wheel assembly in accordance with a second embodiment of the present invention.

FIG. 5 illustrates another embodiment, generally denoted 110, of a wheel assembly in accordance with the present invention consisting of a wheel 112 and a locking element 114, such as may be found on a variety of wheeled products as identified above.

Figure 6:
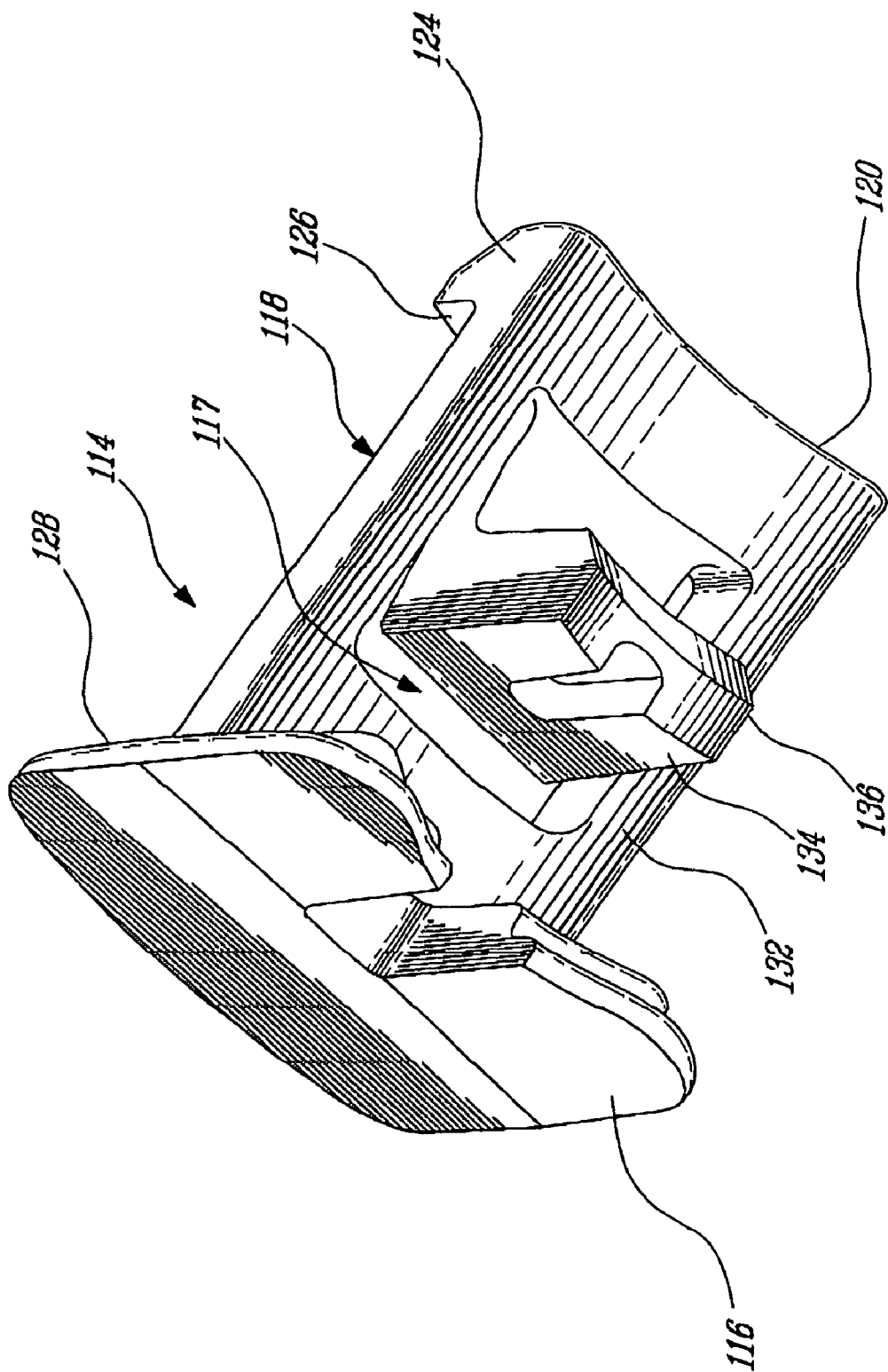
FIG. 6 is a perspective view of the locking element used in the embodiment illustrated in FIG. 5.

Referring to FIGS. 6 and 7, the locking element 114 consists of a plastic molded body having a front wall 116 and a rearwardly extending portion 118. Section 118 has an undersurface 120 which has a shape to fit the contour of a wheel axle 122 (see FIG. 5). Section 118 also has at the free end 124 an edge 126, the function of which will be described hereinbelow. The rear wall 128 of the locking element also includes an edge 130 (see FIG. 7), the function of which will be described further hereinbelow.

The main central area of the projection 118 displays an opening 117 with a detent portion 132 displaying a front cavity 134 and V-shaped lower edge 136 also having a rounded profile to fit the contour of the axle annular groove 137 (see FIG. 7).

Referring to FIG. 8, an opening 146 is provided in the central area 148 of the wheel 112 and shaped to receive the locking element therein.

As can be further seen in FIG. 7, as the locking element 114 is inserted into the opening 146 of the wheel 112, the detent 132 is upwardly flexed as it slides along the periphery of the axle until it drops in engagement in the annular groove 134 of the axle 122.

Portion 160 of the wheel is confined between the edges 126 and 130 of the locking element.

Although the present invention has been described hereinabove by way of embodiments thereof, it may be modified, without departing from the nature and teachings of the subject invention as defined in the appended claims.

What is claimed is:

1. A wheel assembly for mounting to an axle of a wheeled product, comprising:
    a wheel having an axially extending opening; and
    a locking element insertable in said opening;
    said locking element having a pair of extensions, the extensions having:
        a first engagement, mounted on said extensions, which releasingly engages said wheel in said opening by flexing radially of edges of said opening; and
        a detent second engagement, mounted on said extensions, said detent second engagement being flexible to enable said detent second engagement to releasingly engage said axle.

2. A wheel assembly as defined in claim 1, wherein said locking element has a front wall; said pair of extensions extend substantially axially inward from said front wall; said front wall having an access to enable a tool to release said detent second engagement from said axle.

3. A wheel assembly as defined in claim 2, wherein said first engagement comprises a pair of flexible outer arms mounted on said extensions extending substantially axially inward from said front wall.

4. A wheel assembly as defined in claim 3, wherein said detent second engagement comprises a pair of flexible inner arms mounted on said extensions which extend substantially axially toward said front wall.

5. A wheel assembly as defined in claim 4, wherein said opening of said wheel is a central bore.

6. A wheel assembly as defined in claim 2, wherein said access comprises a pair of holes through said front wall allowing said tool to be inserted through said front wall for contactingly disengaging said detent second engagement from an annular groove on said axle.

7. A wheel assembly as defined in claim 2, wherein said access comprises an opening through said front wall.

8. A wheel assembly as defined in claim 7, wherein said detent engagement is shaped to fit into an annular groove on said axle.

9. A locking element for locking a wheel to an axle, comprising:
    a front wall and a pair of extensions, each one of said extensions comprising an outer arm portion and an inner arm portion, each one of said arm portions having a first end opposite a second end; said outer arm portion and said inner arm portion being flexibly mounted to a respective extension, by said first end, said second opposite end being free and extending generally axially towards said front wall;
    upon insertion of the locking element in an opening of the wheel, said outer arm portions being configured to flex radially inward of opposite edges of said opening as the outer arm portions contact said edges of said opening of the wheel, and said inner arms being configured to flex radially outward away from the axle of the wheel as the inner arms contact the axle of the wheel; and
    once the locking element is inserted in the opening of the wheel, said outer arm portions being configured to flex radially outward from the interior of the opening to engage areas of the wheel adjacent the opening, and said inner arms being configured to flex radially inward towards the axle of the wheel and engaging into an annular groove of the axle.

10. A locking element as recited in claim 9, wherein said inner arms disengage from said annular groove of the axle upon action of a tool, said outer arms then disengaging from said wheel.

* * * * *